(12) United States Patent
Burstall

(10) Patent No.: US 6,883,399 B2
(45) Date of Patent: Apr. 26, 2005

(54) VARIABLE INERTIA FLYWHEEL

(75) Inventor: Oliver W. J. Burstall, Hauxton (GB)

(73) Assignee: Perkins Engines Company Limited, Peterborough (GB)

( * ) Notice: Subject to any disclaimer, the term of this patent is extended or adjusted under 35 U.S.C. 154(b) by 188 days.

(21) Appl. No.: 10/392,110

(22) Filed: Mar. 19, 2003

(65) Prior Publication Data
US 2003/0178972 A1 Sep. 25, 2003

(30) Foreign Application Priority Data
Mar. 20, 2002 (GB) .......................................... 0206528

(51) Int. Cl.$^7$ .............................................. F16F 15/30
(52) U.S. Cl. ...................................... 74/573 F; 74/572
(58) Field of Search .......................... 74/572, 573 F, 74/573 R, 574

(56) References Cited

U.S. PATENT DOCUMENTS

| 2,603,103 | A | | 7/1952 | Sohon et al. | |
|---|---|---|---|---|---|
| 3,129,559 | A | | 4/1964 | Matthews | |
| 3,248,967 | A | | 5/1966 | Lewis | |
| 3,926,074 | A | * | 12/1975 | Sugahara | .................... 464/28 |
| 4,069,669 | A | * | 1/1978 | Pitkanen | .................... 60/325 |
| 4,282,948 | A | | 8/1981 | Jerome | |
| 4,335,627 | A | | 6/1982 | Maxwell | |
| 4,504,198 | A | * | 3/1985 | Toyoda et al. | .............. 417/417 |
| 4,546,264 | A | | 10/1985 | Pinson | |
| 4,735,382 | A | | 4/1988 | Pinson | |
| 4,995,282 | A | | 2/1991 | Schumacher | |
| 5,086,664 | A | | 2/1992 | Wagner | |
| 5,490,436 | A | * | 2/1996 | Coyne et al. | .............. 74/573 F |
| 6,013,164 | A | | 1/2000 | Paul et al. | |
| 6,019,882 | A | | 2/2000 | Paul et al. | |
| 6,050,380 | A | | 4/2000 | Peinemann et al. | |
| 6,224,728 | B1 | | 5/2001 | Oborny et al. | |
| 6,277,257 | B1 | | 8/2001 | Paul et al. | |

FOREIGN PATENT DOCUMENTS

| DE | 10200663 A1 | * | 9/2003 | ............ F16F/15/30 |
|---|---|---|---|---|
| EP | 0 418 442 A1 | | 9/1989 | |
| EP | 0 508 790 A1 | | 4/1992 | |
| JP | 57183578 A | | 11/1982 | |
| JP | 56080542 A | | 7/1987 | |
| JP | 9177896 A | | 7/1997 | |

* cited by examiner

Primary Examiner—David A. Bucci
Assistant Examiner—Vicky A. Johnson
(74) Attorney, Agent, or Firm—John J Cheek

(57) ABSTRACT

Variable inertia flywheels are used in power generation apparatus to quickly release stored kinetic energy to meet transient power load demands. Such flywheels typically vary inertia by using either interconnected multiple flywheels having different inertia or by mechanically moving a mass connected with the flywheel radially with respect to the axis of rotation. A variable inertia flywheel according to the present invention comprises a body and a number of fluid movement devices disposed at equal angular intervals about the rotational axis of the body. Each device comprises at least first and second chambers axially aligned in a substantially radial direction and adapted to contain an electrolytic fluid. The first and second chambers are interconnected by a channel that permits transfer of the fluid between the chambers. The movement of the fluid between the chambers is facilitated by an electromagnetic pump.

20 Claims, 2 Drawing Sheets

VARIABLE INERTIA FLYWHEEL

TECHNICAL FIELD

The present invention relates to a rotating, kinetic energy storage device, and in particular to a variable inertia flywheel utilizing electromagnetic pumps.

BACKGROUND

Variable inertia flywheels are utilized in rotating machinery to store energy that may be quickly released should there be a sudden energy demand. Such flywheels are common in the field of electrical power generation. Known variable inertia flywheels vary inertia either by interconnecting multiple flywheels having different inertia or by moving a mass connected with the flywheel radially with respect to the axis of rotation. The moveable mass can be a solid block or it can also be a liquid. One example, where the movement of liquid is facilitated by way of electromechanical pumps can be seen in U.S. Pat. No. 4,735,382.

However, the more moving parts any apparatus has, the greater the chance of failure during its working life. Additionally, known mechanical and electro-mechanical arrangements lack responsiveness when dealing with a sudden increase in demand for power.

The present invention is directed to overcoming one or more of the problems identified above.

SUMMARY OF THE INVENTION

According to one aspect of the present invention, a variable inertia flywheel comprising a body and a plurality of fluid movement devices disposed at angular intervals about the axis of rotation of the body. Each of the devices comprises at least first and second chambers adapted to contain an electrolytic fluid, the chambers being radially spaced from each other; and at least one electromagnetic pump for the movement of the fluid between the first and second chambers.

According to another aspect of the present invention, a method of varying the inertia of a flywheel comprising applying an electric field to an electrolytic fluid to move said fluid from a first chamber provided in said flywheel to a second chamber provided in said flywheel, the second chamber being radially spaced from the first chamber.

In accordance with another aspect of the present invention, a method of generating electrical power in a power generation apparatus comprises determining a load demand with a control system, transmitting a demand signal from the control system to a variable inertia flywheel, varying the inertia of the flywheel in response to the demand signal by moving fluid from a first chamber provided in the flywheel to a second chamber provided in the flywheel, the first chamber being radially spaced from the second chamber, and transferring the stored kinetic energy from the flywheel to the generator.

DETAILED DESCRIPTION

The preferred embodiment described herein shows a rotating, kinetic energy storage device. The energy storage device, or flywheel, may be used with a power generation apparatus. The flywheel uses electromagnetic pumps to move electrolytic fluid between fluid chambers in order to vary the moment of inertia of the flywheel.

Figure 1:
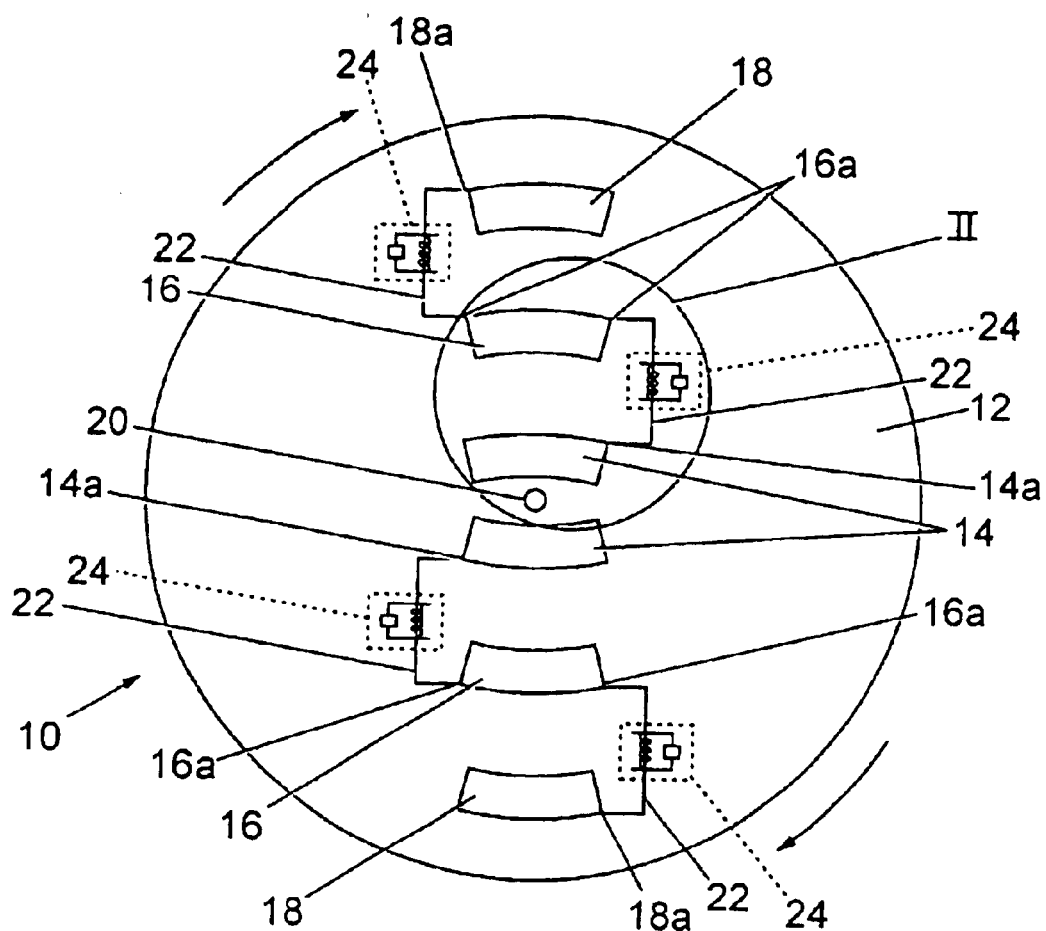
FIG. 1 shows a schematic view of a variable inertia flywheel.

With reference to FIG. 1, there is shown a schematic view of the internal layout of a variable inertia flywheel 10. The flywheel 10 is formed from a solid disc body 12 in which are located one or more sets of chambers 14,16,18. In the embodiment described herein, the flywheel 10 is provided with a pair of fluid movement devices that are located diametrically opposite one another on the flywheel 10. Each device comprises inner 14, intermediate 16 and outer 18 chambers. The three chambers 14,16,18 are spaced from one another in a radial direction relative to the axis of rotation 20 of the flywheel 10. Each device further comprises capillary tubes, or channels, 22 of fused silica which connect the inner and intermediate chambers 14,16 and the intermediate and outer chambers 16,18. The capillary tubes 22 connect the chambers 14,16,18 at openings 14a, 16a, 18a on the radially outermost end of each chamber, that is, the ends of the chambers distal the rotational axis 20 of the flywheel 10. In the case of the intermediate chamber 16, there are two openings 16a located at either corner of the chamber 16 such that the intermediate chamber 16 communicates with both the inner and outer chambers 14,18.

Figure 2:
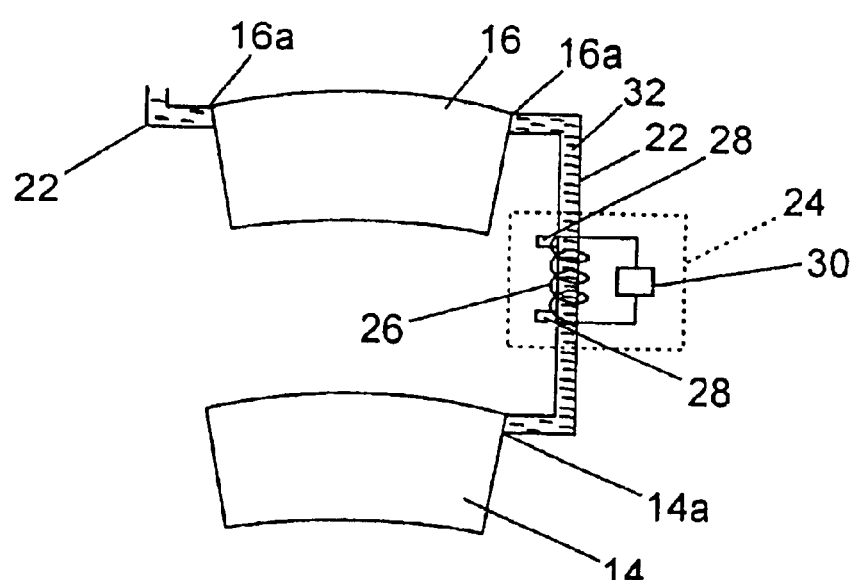
FIG. 2 shows a view of a portion of the variable inertia flywheel shown in FIG. 1.

As best seen in FIG. 2, each device is provided with an electromagnetic pump 24, which is a pump for conducting fluid without the use of moving parts. Electromagnetic pumps suitable for this purpose have been developed by Sandia Corporation of California, USA and are described in detail in U.S. Pat. Nos. 6,013,164, 6,019,882, 6,224,728, and 6,277,257.

The pumps 24 have no moving parts as each uses the principles of electro-osmotic flow to move the fluid. Each pump 24 comprises an electrically energizable coil 26 wrapped around the capillary 22 and connected to a power supply 30. The power supply 30 includes a commercially available slip ring arrangement to power all the pumps. A pair of spaced-apart electrodes 28 is located inside the capillary and is also connected to the power supply 30. The fluid 32 contained in the chambers 14,16,18 and capillaries 22 is an electrolyte solution (i.e. a solution containing ions and capable of ionic conduction). In the embodiment described here, the fluid 32 is a solution of water and trisodium phosphate.

Industrial Applicability

The present invention varies the inertia of the flywheel 10 by moving the electrolytic fluid 32 between the chambers 14,16,18. The manner in which the fluid 32 is moved between the chambers 14,16,18 can be described best with reference to FIG. 2.

Figure 3:
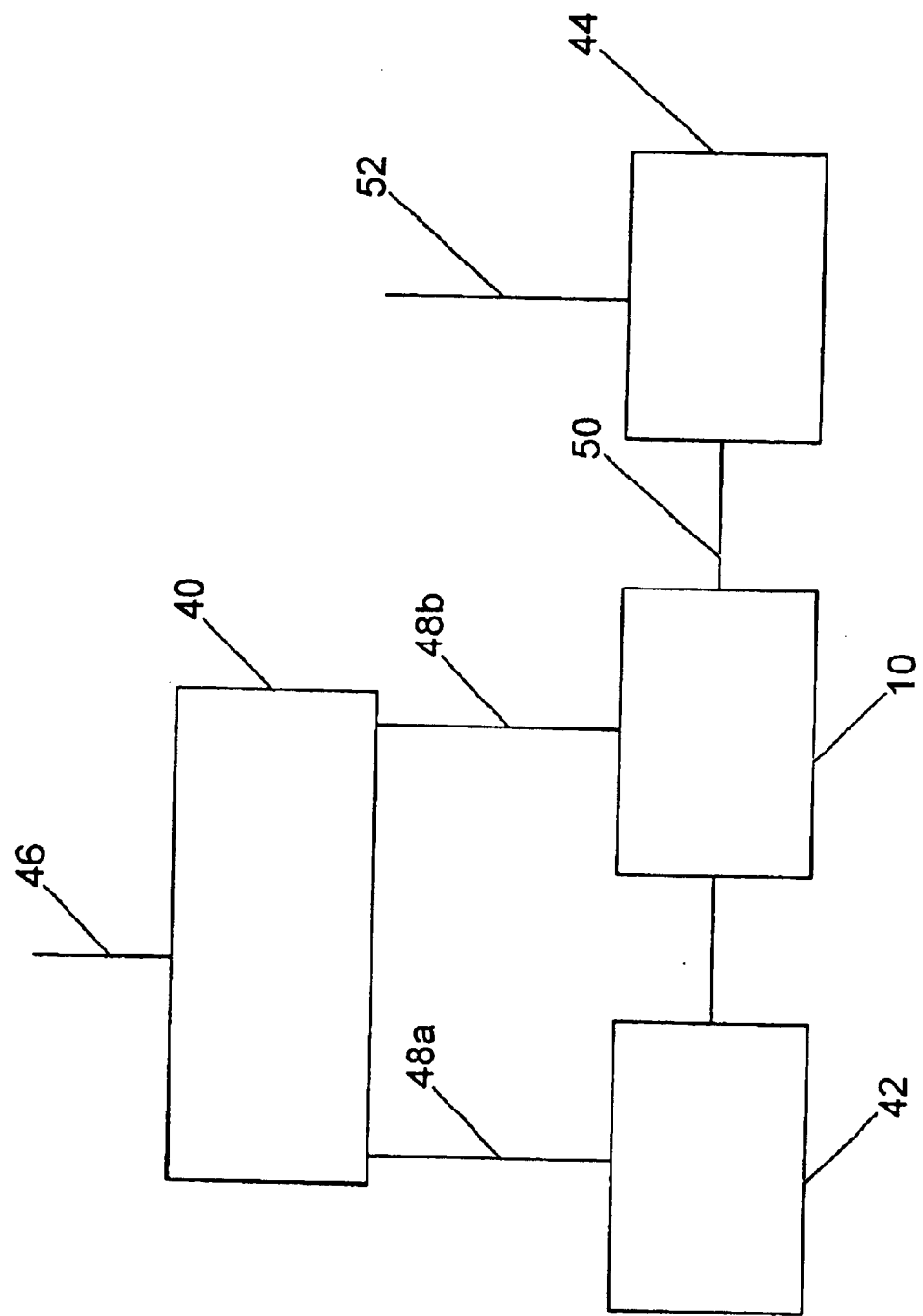
FIG. 3 shows a schematic diagram of an electrical power generation apparatus incorporating the present invention.

The specific embodiment described herein relates to a flywheel for use with a power generation apparatus, as shown in FIG. 3. The apparatus comprises a control system 40, a generator driving device such an internal combustion engine 42, a variable inertia flywheel 10 and a power generator 44. The control system 40 has control over both the engine 42 and flywheel 10 via a pair of control inputs 48a, 48b. The control system 40 receives input signals 46 that indicate the present power demand and whether a steady state or transient load is required from the generator 44. If the generation apparatus receives an input signal 46 requiring a change from a steady state load to a transient load, it will be necessary to quickly reduce the moment of inertia of the flywheel 10, and hence the stored kinetic energy therein, in order to meet the extra demand. Thus, the control system 40 sends a signal via control input 48b to the flywheel 10 to reduce the moment of inertia thereof. As the moment of inertia is reduced, the kinetic energy of the flywheel 10 is transferred 50 to the generator 44, allowing the generator to increase the amount of power generated through an outlet 52.

Referring again to FIG. 2, to reduce the moment of inertia, the electrolytic fluid 32 in the flywheel must be pumped towards the axis of rotation 20 of the flywheel 10. In the embodiment described herein, there are two sets of three chambers 14,16,18 positioned diametrically opposite one another on the flywheel 10. To reduce the moment of inertia of the flywheel 10 to a minimum it is necessary to pump the fluid 32 into the inner chambers 14 from the intermediate 16 or outer chambers 18.

The method of operation of the pumps 24 between the chambers 14,16,18 is the same, whether fluid 32 is being pumped from the outer 18 or intermediate 16 chambers. As the openings 14a,16a,18a of the chambers 14,16,18 are located on the outermost edges of the chambers 14,16,18, the centrifugal force of the rotating flywheel 10 ensures that the fluid 32 will always be in the ideal position within the chamber 14,16,18 for pumping. Once the energy demand has been received by a control system (not shown), the control system will then send a signal to the pumps 24 of the respective sets of chambers to pump the fluid 32 to the inner chamber 14.

Upon receipt of the signal from the control system, the pumps 24 apply an electric potential between the electrodes 28 and an electromagnetic field in the coil 26 by way of the power supply 30. The electrodes 28 are in contact with the electolyte 32 contained within the capillaries 22. The direction of flow of the electrolyte 32 is determined by the polarity of the applied electric potential. Furthermore, the flow rate of the electrolyte 32 is determined by the magnitude of the applied electric potential, where the flow rate will increase in proportion to an increase in electric potential. Thus, to move the electrolytic fluid 32 in the opposite direction (i.e. to pump from the inner chamber 14 towards the intermediate 16 and outer chambers 18), the polarity of the electric potential applied between the electrodes and through the coil is simply reversed.

The present invention enables the inertia of a flywheel to be adjusted by moving a fluid between chambers using hydraulic pumps that, due to the application of electro-osmotic flow properties, require no moving parts. As there are no moving parts in the pumps, the pumps will not be susceptible to frictional wear unlike conventional mechanical fluid movement systems. Furthermore, as the system of fluid movement within the flywheel is electrical rather than mechanical, it can be rapidly turned on and off to provide a more instantaneous response to sudden energy demands compared with conventional flywheel arrangements. As apparent, the inertia of the flywheel can be varied to transmit stored energy to the generator while maintaining the power output of the internal combustion engine at a constant level.

Although the above description is of one particular embodiment of the present invention, modifications and improvements can be incorporated without departing from the scope of the invention. For example, by varying the number of fluid movement devices on the flywheel and/or the number of chambers in each fluid movement device, the inertia of the flywheel can be controlled more accurately than existing variable inertia flywheels. Hence, each device could be provided with two, three or more chambers depending on the operational requirements of the flywheel. The flywheel can also be provided with two or more fluid movement devices, so long as each device is disposed symmetrically about the axis of rotation of the flywheel to maintain balance. Furthermore, the capillaries may take a number of forms in addition to the silica structure given as an example herein, while the electrolytic fluid may be any solution containing ions and being capable of ionic conduction. Although the preferred embodiment of the flywheel has only one slip ring arrangement for powering the pumps, an alternative arrangement may also be used. In the alternative arrangement, a slip ring arrangement is provided for each level of pumps, that is one arrangement for powering the pumps between the outer and intermediate chambers and one arrangement for powering the pumps between the intermediate and inner chambers. Those skilled in the art will also recognize that certain aspects of this invention may be implemented with suitable pumps other than the electromagnetic pumps described above.

What is claimed is:

1. A variable inertia flywheel comprising a body and a plurality of fluid movement devices disposed about the axis of rotation of the body, each of the devices comprising:
   at least first and second chambers adapted to contain an electrolytic fluid, the chambers being radially spaced from each other; and
   at least one electromagnetic pump for the movement of the fluid between the first and second chambers.

2. The variable inertia flywheel of claim 1, wherein the first and second chambers are formed within the body.

3. The variable inertia flywheel of claim 1, wherein the first and second chambers are axially aligned in a substantially radial direction relative to the axis of rotation.

4. The variable inertia flywheel of claim 1, wherein each fluid movement device further comprises at least a first channel permitting transfer of the fluid between the first and second chambers.

5. The variable inertia flywheel of claim 1, wherein the electromagnetic pump comprises:
   an electrically energizable coil disposed about the exterior of the first channel;
   a pair of electrodes spaced from one another and in communication with the electrolytic fluid; and
   a power supply for applying an electric potential to the electrodes and the coil.

6. The variable inertia flywheel of claim 1, wherein each chamber has an outer end disposed distal the rotational axis and where its respective channel opens into the chamber adjacent the outer end, the chamber being adapted such that the fluid is urged toward the outer end under the action of centrifugal force.

7. The variable inertia flywheel of claim 1, wherein each of the devices comprises first, second and third chambers, and first and second electromagnetic pumps for the movement of fluid between the first and second and second and third chambers, respectively.

8. The variable inertia flywheel of claim 1, wherein the plurality of fluid movement devices are disposed at equal angular intervals about the axis of rotation of the body.

9. The variable inertia flywheel of claim 1, wherein the electrolytic fluid is a solution of water and trisodium phosphate.

10. A power generation apparatus, comprising:
    a generator driving device;
    a variable inertia flywheel according to claim 1 drivingly connected with the generator driving device; and
    a generator drivingly connected with the variable inertia flywheel.

11. The power generation apparatus of claim 10, further comprising:

a control system adapted to determine a load demand and operable to control the inertia of said variable inertia flywheel in response to the determined load demand.

12. The power generation apparatus of claim 10, wherein the generator driving device includes an internal combustion engine.

13. A method of varying the inertia of a flywheel comprising applying an electric field to an electrolytic fluid to move said fluid from a first chamber provided in said flywheel to a second chamber provided in said flywheel, the first chamber being radially spaced from said second chamber.

14. A method of generating electrical power in a power generation apparatus comprising a control system, a generator driving device, a variable inertia flywheel, and a generator, the method comprising the steps of:

determining a load demand with the control system;

transmitting a demand signal from the control system to the variable inertia flywheel;

varying the inertia of the flywheel in response to the demand signal by moving fluid from a first chamber provided in said flywheel to a second chamber provided in said flywheel, the first chamber being radially spaced from said second chamber, and transferring stored kinetic energy from the flywheel to the generator.

15. The method of claim 14, wherein said stored kinetic energy is transferred from the flywheel to the generator as a result of change in the inertia of the flywheel.

16. The method of claim 15 wherein said flywheel comprises the flywheel of claim 1, wherein the fluid comprises an electrolytic fluid, and wherein said varying step includes applying an electric field to the electrolytic fluid to move said fluid from the first chamber to the second chamber.

17. The method of claim 15, further comprising:

during the varying and transferring step, maintaining a power output of the generator driving device at a substantially constant level.

18. The method of claim 14 wherein said load demand includes a transient load demand for electrical power from the electrical power generation apparatus.

19. A method of generating electrical power in a power generation apparatus comprising a control system, a generator driving device, a variable inertia flywheel, and a generator, the method comprising the steps of:

determining a load demand with the control system;

transmitting a demand signal from the control system to the variable inertia flywheel;

varying the inertia of the flywheel in response to the demand signal by moving fluid from a first chamber provided in said flywheel to a second chamber provided in said flywheel, the first chamber being radially spaced from said second chamber; and transferring stored kinetic energy from the flywheel to the generator;

wherein said flywheel comprises the flywheel of claim 1, wherein the fluid comprises an electrolytic fluid, and wherein said varying step includes applying an electric field to the electrolytic fluid to move said fluid from the first chamber to the second chamber.

20. A method of generating electrical power in a power generation apparatus comprising a control system, a generator driving device, a variable inertia flywheel, and a generator, the method comprising the steps of:

determining a load demand with the control system;

transmitting a demand signal from the control system to the variable inertia flywheel;

varying the inertia of the flywheel in response to the demand signal by moving fluid from a first chamber provided in said flywheel to a second chamber provided in said flywheel, the first chamber being radially spaced from said second chamber;

transferring stored kinetic energy from the flywheel to the generator; and during the varying and transferring steps, maintaining a power output of the generator driving device at a substantially constant level.

* * * * *